United States Patent
Jiang et al.

(10) Patent No.: US 11,647,433 B2
(45) Date of Patent: May 9, 2023

(54) METHOD AND APPARATUS FOR NETWORK ACCESS, TERMINAL, AND STORAGE MEDIUM

(71) Applicant: BEIJING XIAOMI MOBILE SOFTWARE CO., LTD., Beijing (CN)

(72) Inventors: Cheng Jiang, Beijing (CN); Song Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/334,995

(22) Filed: May 31, 2021

(65) Prior Publication Data

US 2022/0116836 A1    Apr. 14, 2022

(30) Foreign Application Priority Data

Oct. 13, 2020   (CN) .......................... 202011089085.7

(51) Int. Cl.
    *H04W 36/00*      (2009.01)
    *H04W 36/08*      (2009.01)
    *H04W 48/18*      (2009.01)
    *H04W 48/16*      (2009.01)
    *H04W 88/06*      (2009.01)

(52) U.S. Cl.
CPC ... *H04W 36/0072* (2013.01); *H04W 36/0077* (2013.01); *H04W 36/0079* (2018.08); *H04W 36/08* (2013.01); *H04W 48/18* (2013.01); *H04W 48/16* (2013.01); *H04W 88/06* (2013.01)

(58) Field of Classification Search
CPC ..... H04W 12/06; H04W 60/00; H04W 48/18; H04W 48/16; H04W 36/14; H04W 12/72; H04W 88/06; H04W 76/10; H04W 12/43; H04W 12/40; H04W 12/45
See application file for complete search history.

(56) References Cited

U.S. PATENT DOCUMENTS

| | | |
|---|---|---|
| 2013/0288694 A1 | 10/2013 | Mochizuki et al. |
| 2014/0113614 A1 | 4/2014 | Liu et al. |
| 2014/0128070 A1 | 5/2014 | Ni et al. |

(Continued)

FOREIGN PATENT DOCUMENTS

| | | |
|---|---|---|
| CN | 111314972 A | 6/2020 |
| CN | 111565441 A | 8/2020 |

(Continued)

OTHER PUBLICATIONS

Extended European Search Report in the European Application No. 21175980.8, dated Nov. 11, 2021, (7p).

(Continued)

*Primary Examiner* — Nam T Huynh
(74) *Attorney, Agent, or Firm* — Arch & Lake LLP

(57) ABSTRACT

A method for network access, a terminal, and a storage medium are provided. The method includes that: the terminal acquires a first frequency band corresponding to a first cell where the terminal camps; determines whether the first frequency band belongs to a second frequency band predetermined by the terminal; and performs handover to a second cell which is different from the first cell in response to determining that the first frequency band does not belong to the second frequency band.

17 Claims, 5 Drawing Sheets

(56) References Cited

U.S. PATENT DOCUMENTS

| | | | |
|---|---|---|---|
| 2015/0072683 A1* | 3/2015 | Xiang | H04W 60/00 |
| | | | 455/435.2 |
| 2015/0245286 A1 | 8/2015 | Ni et al. | |
| 2016/0270035 A1 | 9/2016 | Mochizuki et al. | |
| 2018/0242281 A1 | 8/2018 | Mochizuki et al. | |
| 2018/0332430 A1 | 11/2018 | Kumar et al. | |
| 2019/0116580 A1 | 4/2019 | Mochizuki et al. | |
| 2019/0159101 A1* | 5/2019 | Yu | H04W 36/32 |
| 2019/0342863 A1 | 11/2019 | Mochizuki et al. | |
| 2020/0187167 A1 | 6/2020 | Mochizuki et al. | |
| 2021/0029677 A1 | 1/2021 | Mochizuki et al. | |
| 2021/0306921 A1* | 9/2021 | Niu | H04W 48/16 |

FOREIGN PATENT DOCUMENTS

| | | | | |
|---|---|---|---|---|
| CN | 113645688 A | * | 11/2021 | |
| EP | 2663148 A1 | | 11/2013 | |
| EP | 2728940 A1 | | 5/2014 | |
| EP | 3979688 A1 | * | 4/2022 | H04W 24/02 |
| WO | 2016101556 A1 | | 6/2016 | |
| WO | 2020142896 A1 | | 7/2020 | |
| WO | WO-2021259449 A1 | * | 12/2021 | |

OTHER PUBLICATIONS

First Office Action of the Chinese Application No. 202011089085.7, dated Oct. 8, 2022, (15p).

\* cited by examiner

METHOD AND APPARATUS FOR NETWORK ACCESS, TERMINAL, AND STORAGE MEDIUM

CROSS-REFERENCE TO RELATED APPLICATION

This application is based on and claims priority to Chinese Patent Application No. 202011089085.7, filed on Oct. 13, 2020, which is incorporated herein by reference in its entirety for all purposes.

BACKGROUND

With the rapid development of wireless communication technology, various operators are actively constructing communication devices for mobile communication networks such as 4G, 5G and even future 6G. It is a development trend for current operators to share and co-construct wireless cellular network, which is beneficial to reducing repeated investment of the operators and increasing network coverage. However, sharing the network may have compatibility problems due to different configurations of different operators, so that it is difficult for the terminal to access the network service when it is camping on a cell of the shared network. In this case, the terminal is in a state where the network service is unavailable for a long time, and thus the user experience is reduced.

SUMMARY

The present disclosure relates to the mobile communication technology, and particularly to a method and an apparatus for network access, a terminal, and a storage medium.

According to a first aspect of the present disclosure, there is provided a method for network access, which is applied to a terminal and includes following operations. A first frequency band corresponding to a first cell where the terminal camps is acquired. It is determined whether the first frequency band belongs to a second frequency band predetermined by the terminal. Handover to a second cell which is different from the first cell is performed in response to determining that the first frequency band does not belong to the second frequency band.

According to a second aspect of the present disclosure, there is provided a terminal, including at least a processor and a memory for storing instructions executed by the processor. The processor is configured to: acquire a first frequency band corresponding to a first cell where the terminal camps; determine whether the first frequency band belongs to a second frequency band predetermined by the terminal; and perform handover to a second cell which is different from the first cell in response to determining that the first frequency band does not belong to the second frequency band.

According to a third aspect of the present disclosure, there is provided a non-transitory computer-readable storage medium, having stored thereon computer-executable instructions that, when being executed by a processor, cause the processor to implement steps in the method according to the first aspect as described above.

It is to be understood that the foregoing general descriptions and the following detailed descriptions are only exemplary and explanatory and not intended to limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings indicate the same or similar elements unless otherwise indicated. The implementations described in the following exemplary embodiments do not represent all implementations consistent with the present disclosure. Instead, they are merely examples of apparatuses and methods consistent with aspects of the disclosure as detailed in the appended claims.

Figure 1:
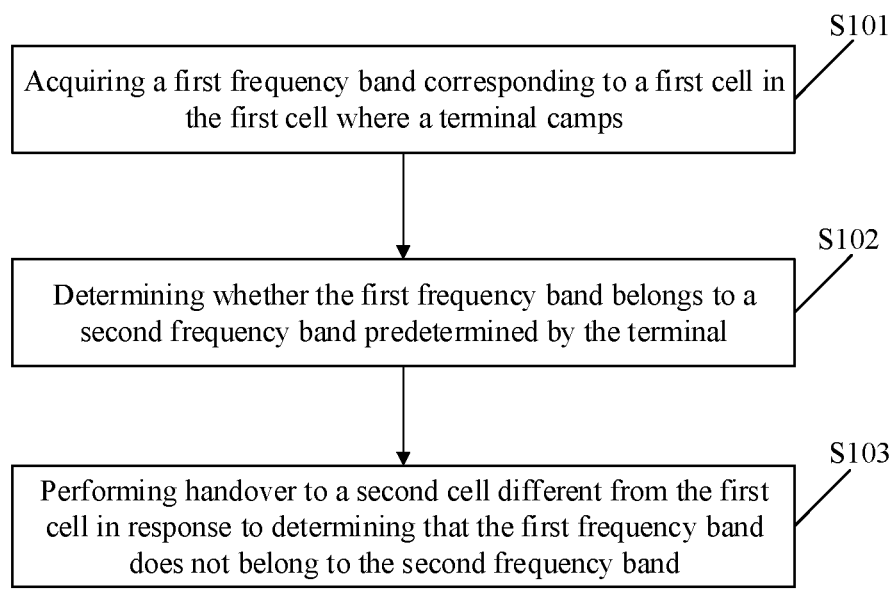
FIG. 1 is a first flowchart of a method for network access according to some embodiments of the present disclosure.

FIG. 1 is a first flowchart of a method for network access according to some embodiments of the present disclosure. The method is applied to a terminal. As shown in FIG. 1, the method includes the following operations.

In S101, a first frequency band corresponding to a first cell where the terminal camps is acquired by the terminal.

In S102, it is determined by the terminal whether the first frequency band belongs to a second frequency band predetermined by the terminal.

In S103, handover to a second cell different from the first cell is performed by the terminal in response to determining that the first frequency band does not belong to the second frequency band.

In the embodiments of the disclosure, the terminal may perform handover to the first cell by cell selection, cell reselection, cell handover or cell redirection, and the first cell may provide a network where the terminal can camp. The network provided by the first cell for the terminal may be a network provided by the same operator as the operator of the subscriber identity card of the terminal itself, or may be a shared network provided by another operator different from the operator of the subscriber identity card. For example, a subscriber identity card in a terminal is a subscriber identity card of China Telecom, and a network in a cell where the terminal currently camps is provided by a base station of China Mobile. Since the China Mobile provides a shared network where the subscriber identity card of the China Telecom can camp, the subscriber identity card of the terminal can successfully perform handover to and camp on the cell.

However, if the network provided by the first cell is a shared network, the terminal may fail to normally access service communication for data connection due to problems such as compatibility of network configuration. Therefore, an access failure may occur when the terminal initiates an access request at this time.

Since the network frequency bands used by different operators are different, in the embodiments of the present disclosure, the terminal may determine whether the network of the first cell is a network provided by an operator corresponding to the subscriber identity card of the terminal itself according to a frequency band of a network. In the embodiments of the present disclosure, the second frequency band predetermined by the terminal may be a frequency band range that can be used by the terminal for network communication. If the first frequency band of the first cell belongs to the second frequency band, the terminal may perform data interaction by using a network of the first cell.

In one embodiment, the terminal may acquire an operating frequency band of the subscriber identity card through the installed subscriber identity card as the predetermined second frequency band. For example, if the terminal detects that the network operator of the installed subscriber identity card is the China Mobile, the terminal correspondingly obtains the operating frequency band used by the network service of the China Mobile.

In another embodiment, the terminal may preset the operating frequency bands of all operators supported at the time of delivery, for example, the operating frequency bands of China Mobile, China Unicom and China Telecom may be preset respectively. Then, in use of the terminal, the operator to which the installed subscriber identity card belongs is detected and the corresponding preset operating frequency band is determined as the second frequency band.

In another embodiment, the terminal may query and acquire the operating frequency bands of different operators through the network and store them. Then, the operator to which the installed subscriber identity card belongs is detected and the corresponding stored operating frequency band is determined as the second frequency band.

For example, the second frequency band predetermined by the terminal is a frequency band range provided by an operator of a subscriber identity card used for network data exchange in the terminal. If the first frequency band of the first cell belongs to the second frequency band, the terminal may consider that the network provided by the first cell is a network provided by the operator of the subscriber identity card of the terminal. If the first frequency band of the first cell does not belong to the second frequency band, the network provided by the first cell may not be the network provided by the operator of the subscriber identity card of the terminal, but a shared network provided by other operators.

If the network of the first cell is a shared network provided by another operator, there may be a case where it is not compatible with the subscriber identity card of the terminal, and the terminal may not be able to normally access and use the network service. In this case, the terminal may perform handover to a second cell which is different from the first cell.

In this way, a cell, such as a shared network which may not provide a normal network service, is identified through determination of the frequency band, so that access to such cell is terminated and a cell handover is performed in time. Therefore, a case in which a network connection cannot be established at all due to repeated access attempts is reduced, and thus the use effect of the user terminal is improved.

Figure 2:
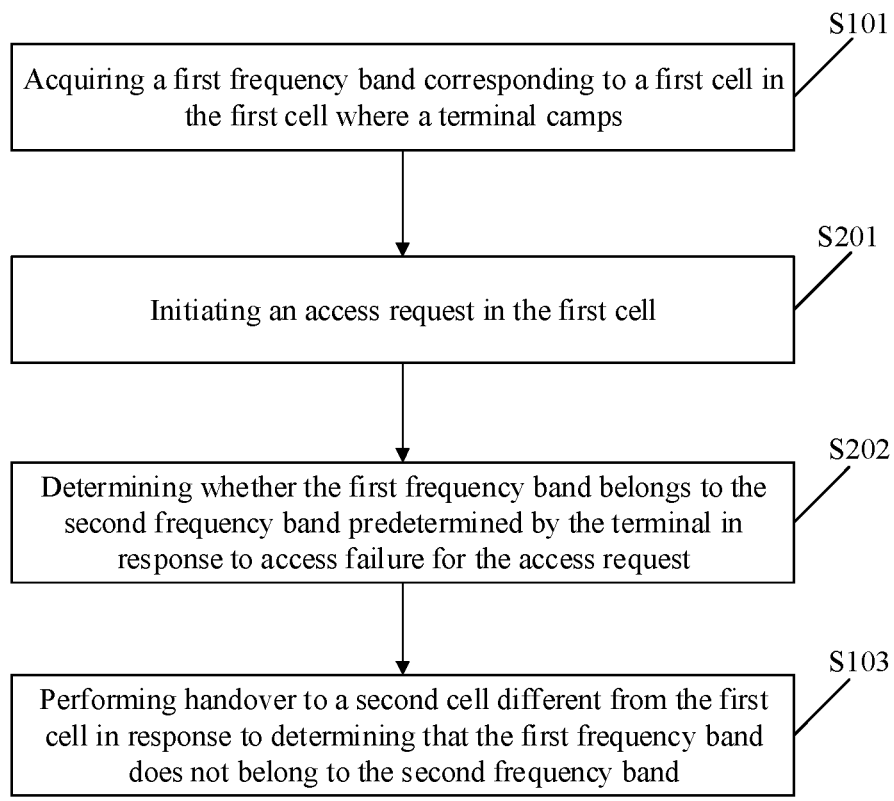
FIG. 2 is a second flowchart of a method for network access according to some embodiments of the present disclosure.

In some embodiments, as shown in FIG. 2, the operation that the terminal determines whether the first frequency band belongs to the second frequency band predetermined by the terminal includes the following operations.

In S201, an access request is initiated in the first cell.

In S202, in response to an access failure for the access request, it is determined whether the first frequency band belongs to the second frequency band predetermined by the terminal.

In the embodiments of the present disclosure, if the terminal successfully accesses the first cell after initiating the access request in the first cell, the terminal may perform normal data interaction regardless of whether the network provided by the first cell is a shared network, and in this case, determination of the frequency band may not be performed.

If the terminal fails to access the first cell after initiating the access request in the first cell, it may occur because the current cell congests and the like, or the network of the first cell is a shared network provided by other operators and there is a compatibility problem, resulting in the terminal unable to access and use the network normally.

Therefore, in the embodiments of the present disclosure, in the case of an access failure after the terminal initiates the access request, whether a network is available may be determined according to whether the first frequency band of the first cell belongs to the second frequency band predetermined by the terminal. If the first frequency band belongs to the second frequency band, the access failure may be caused by cell congestion or the like, and the terminal may reinitiate an access request to attempt to access the network. For example, the terminal may reinitiate the access request after waiting for a predetermined duration, or reinitiate the access request after receiving related information of cell congestion removal.

Whereas, if the first frequency band does not belong to the second frequency band, the first cell may be unable to provide a network available to the terminal, and in this case even if the terminal reinitiates an access request, the network cannot be accessed. Therefore, the terminal terminates the access to the current cell at this time, retries to perform handover to another cell and initiates an access request to the cell.

In this way, regardless of whether the network provided by the cell accessed by the terminal is a shared network or not, determination of the frequency band is performed when the access fails, which reduces the amount of data processing. Moreover, even if the network provided by the first cell is a shared network, if it can meet the normal access requirement of the terminal to perform data interaction, then the shared network provided by other operators can be effectively utilized without performing the cell handover, thereby reducing the case of frequent cell handover.

In some embodiments, the method further includes the following operation.

The access request is reinitiated in the first cell in response to determining that the first frequency band belongs to the second frequency band.

Since the second frequency band belongs to a network frequency band supported by the operator of the subscriber identity card of the terminal, the terminal may be able to successfully access the first cell if the first frequency band belongs to the second frequency band. The access failure of the network as mentioned previously may be caused by other conditions, such as cell congestion or failure, not caused by the operator providing the network service in the first cell and the operator of the terminal subscriber identity card being different. Therefore, after the access fails, the terminal may reinitiate the access request to continue to attempt to access the first cell. If the failure of the first cell is removed or the cell is no longer congested, the network can be successfully accessed by the terminal to obtain network services.

In some embodiments, the method further includes the following operation.

Data transmission of a service corresponding to the access request is performed in response to an access success for the access request.

In the embodiments of the present disclosure, the access request initiated by the terminal may be an access request triggered based on a service application. That is, when a service application of the terminal needs to perform data interaction, the terminal initiates an access request corresponding to the service application to the base station. If the access request of the terminal is responded to by the base station and the communication connection is successfully established between the terminal and the base station, the data transmission of the service corresponding to the access request may be further performed. The access request triggered based on the service application may include a registration request, a data request, and a call request for the service, and the like.

For example, when the terminal uses a call service, the terminal initiates an access request to the base station. After successful access to the base station, the terminal implements the call with the peer end by using the data interaction provided by the network. For another example, when the terminal needs to download data, the terminal initiates an access request to the base station, and after successful access, the terminal can download the required data from the corresponding server through the base station.

In some embodiments, the method further includes the following operations.

Card information of a subscriber identity card installed in the terminal is acquired.

The second frequency band is determined according to the card information.

In the embodiments of the present disclosure, after a subscriber identity card is installed, the terminal may acquire the corresponding second frequency band through the card information of the subscriber identity card. Since the subscriber identity cards of different operators carry information such as the operator identifications of the respective operators, the terminal can directly acquire the card information of an operator of the subscriber identity card through an interface. Since the frequency bands used by different operators are relatively fixed, the terminal can pre-store the corresponding frequency bands of the respective operators in advance. After the terminal obtains the operator information of the subscriber identity card, the terminal can search the frequency band corresponding to the operator information.

If the supported frequency bands are directly recorded in the subscriber identification card, that is, the card information of the subscriber identity card includes the frequency band information, the terminal may also directly acquire the frequency band supported by the subscriber identity card through the interface, thereby determining the second frequency band.

In some embodiments, the card information includes an operator identification of the subscriber identity card.

The operation that the second frequency band is determined according to the card information may include the following operation.

A frequency band corresponding to an operator of the subscriber identity card is determined as the second frequency band according to the operator identification of the subscriber identity card.

The operator identification includes a code for uniquely identifying an operator of a subscriber identity card, such as an MCC (Mobile Country Code), an MNC (Mobile Network Code), and the like. The terminal may determine the operator of the subscriber identity card according to the operator identification, and determine the second frequency band according to the frequency band that the operator provides a network service.

In some embodiments, the operation that a first frequency band corresponding to a first cell where the terminal camps is acquired by the terminal may include the following operation.

The first frequency band corresponding to the first cell is acquired when the terminal accesses the first cell.

In the embodiments of the present disclosure, each time the terminal performs handover to a new cell, the terminal may acquire a frequency band used by the cell for data interaction. Therefore, when the terminal enters the first cell by means of cell selection, cell reselection, cell handover or cell redirection, the first frequency band corresponding to the first cell can be acquired by the terminal.

The embodiments of the present disclosure also provide the following examples.

It is a development trend for current operators to share and co-construct a wireless cellular network, which is beneficial to reducing repeated investment of the operators and increasing network coverage. However, sharing the network also poses some new problems for the terminal. For example, in a shared network, some compatibility problems often occur when a terminal accesses a shared network of a non-home operator, which causes the terminal to be in a service unavailable state for a long time, resulting in an unfriendly experience to a terminal user.

In particular, at the initial stage of constructing the network hardware facility, there are still some compatibility problems in the shared and co-constructed network. The terminal of the operator A often continuously fails to access the shared network environment of the operator B, which causes the terminal to be unable to use the normal network service for a long time.

Figure 3:
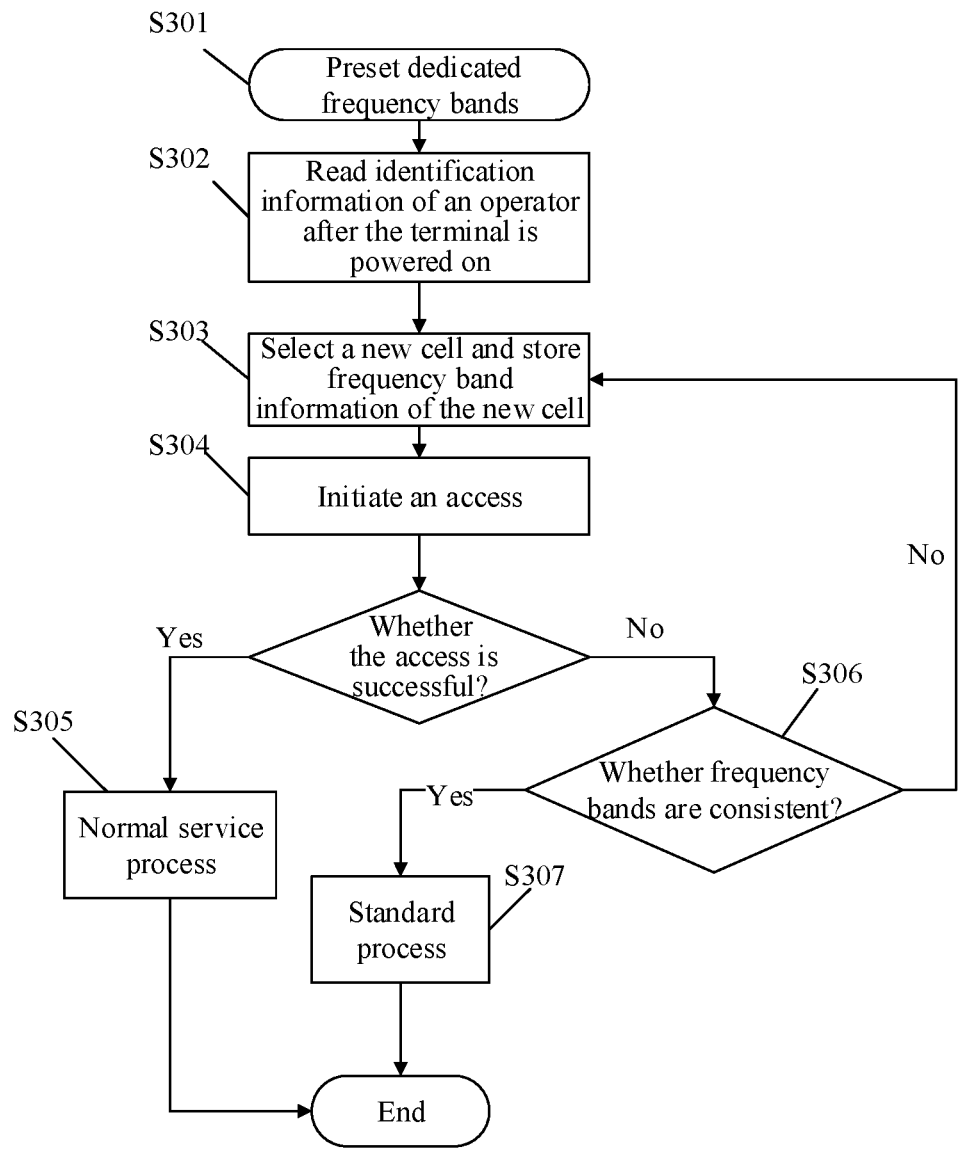
FIG. 3 is a third flowchart of a method for network access according to some embodiments of the present disclosure.

In view of the above, FIG. 3 provides a third flowchart of a method for network access according to some embodiments of the present disclosure. As shown in FIG. 3, the method includes the following operations.

In S301, dedicated frequency bands of various operators are preset in a terminal.

In S302, after being powered on, the terminal obtains, from a Subscriber Identity Module (SIM) card or a User Identity Model (UIM) card, identification information of an operator to which the SIM card or UIM card belongs.

In S303, the terminal selects to enter a new cell based on cell selection, cell reselection, cell handover or cell redirection, and stores frequency band information of the new cell.

In S304, the terminal initiates an access procedure such as registration, handover, and service request.

In S305, if the access is successful, the terminal performs data interaction required by the service, namely, normal service process.

In S306, if the access fails, the terminal determines whether the frequency band of the current cell is a dedicated frequency band of the operator to which the SIM or UIM card of the terminal belongs.

In S307, if the frequency band of the current cell is consistent with the dedicated frequency band of the operator to which the SIM or UIM card of the terminal belongs, the next operation is performed according to a standard process.

The standard process includes reinitiating the access procedure in the current cell.

If the frequency band of the current cell does not belong to the dedicated frequency band of the operator to which the SIM or UIM card belongs, the terminal terminates the access attempt of the current cell and re-selects a new cell to attempt to access.

Figure 4:
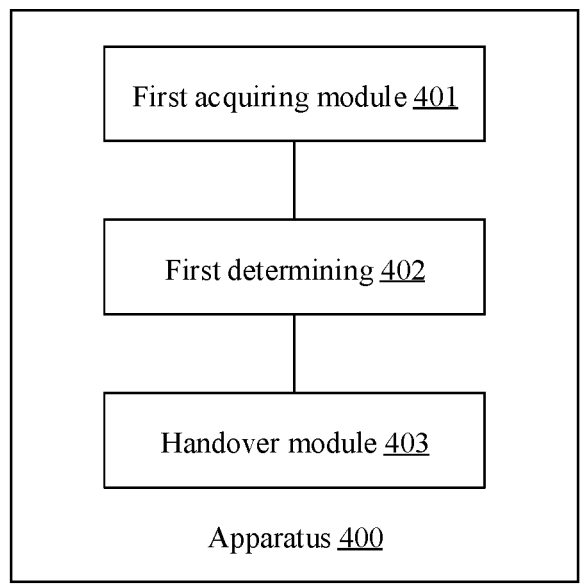
FIG. 4 is a structural block diagram of an apparatus for network access according to some embodiments of the present disclosure.

FIG. 4 is a structural block diagram of an apparatus for network access according to some embodiments of the present disclosure, the apparatus being applied to a terminal. As shown in FIG. 4, the apparatus 400 includes a first acquiring module 401, a first determining module 402 and a handover module 403.

The first acquiring module 401 is configured to acquire a first frequency band corresponding to a first cell where the terminal camps.

The first determining module 402 is configured to determine whether the first frequency band belongs to a second frequency band predetermined by the terminal.

The handover module 403 is configured to perform handover to a second cell which is different from the first cell in response to determining that the first frequency band does not belong to the second frequency band.

In some embodiments, the first determining module includes an initiating submodule and a first determining submodule.

The initiating submodule is configured to initiate an access request in the first cell.

The first determining submodule is configured to determine whether the first frequency band belongs to the second frequency band predetermined by the terminal in response to an access failure for the access request.

In some embodiments, the apparatus further includes an initiating module.

The initiating module is configured to reinitiate the access request in the first cell in response to determining that the first frequency band belongs to the second frequency band.

In some embodiments, the apparatus further includes a transmission module.

The transmission module is configured to perform data transmission of a service corresponding to the access request in response to an access success for the access request.

In some embodiments, the apparatus further includes a second acquiring module and a second determining module.

The second acquiring module is configured to acquire card information of a subscriber identity card installed in the terminal.

The second determining module is configured to determine the second frequency band according to the card information.

In some embodiments, the card information includes an operator identification of the subscriber identity card.

The second determining module includes a second determining submodule.

The second determining submodule is configured to determine a frequency band corresponding to an operator of the subscriber identity card as the second frequency band according to the operator identity of the subscriber identity card.

In some embodiments, the first acquiring module includes an acquiring submodule.

The acquiring submodule is configured to acquire the first frequency band corresponding to the first cell when the terminal handed over to the first cell.

With respect to the apparatus in the above-described embodiments, the specific manner that various modules perform operations has been described in detail in the embodiments of the method, and will not be described in detail herein.

Figure 5:
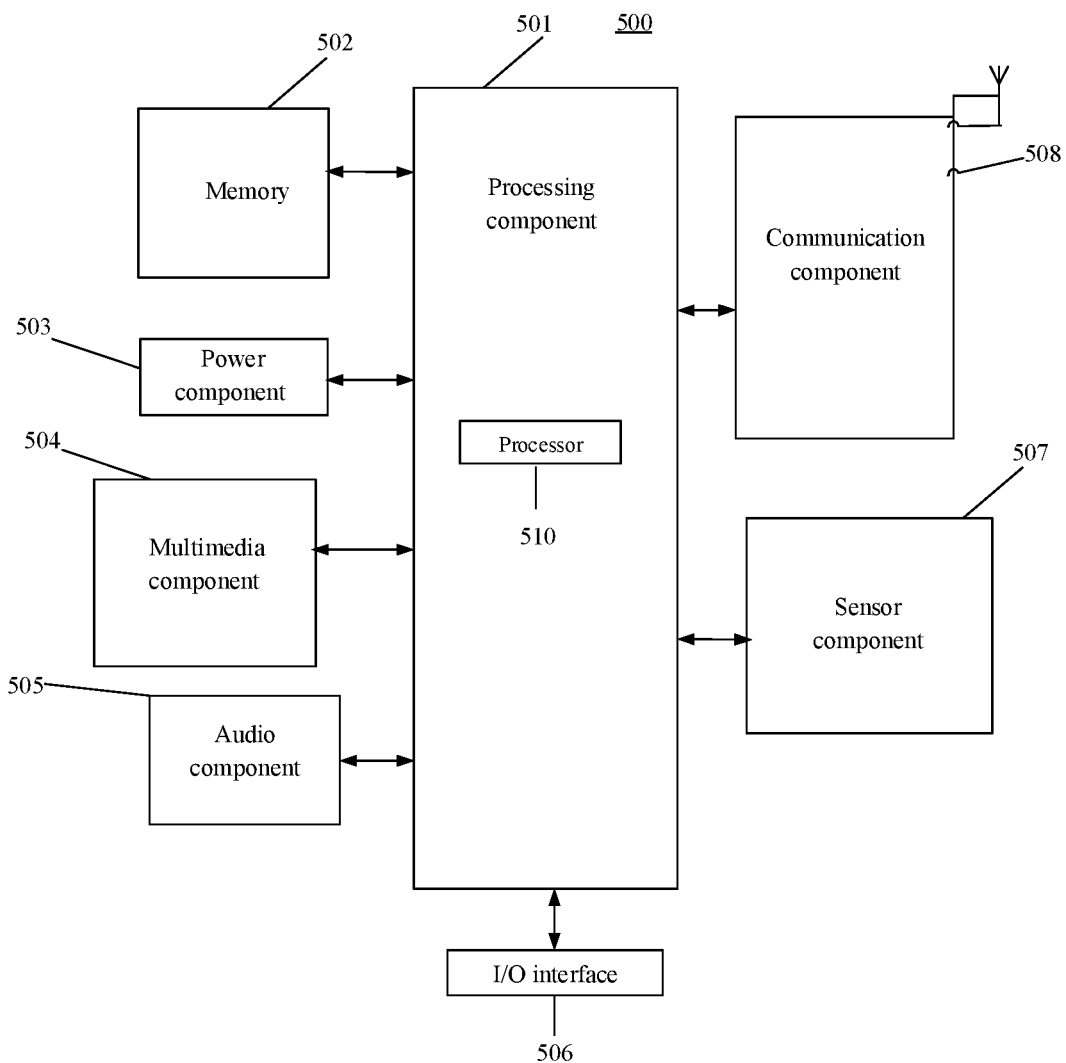
FIG. 5 is a structural block diagram of entities of a terminal according to some embodiments of the present disclosure.

FIG. 5 is a block diagram of a terminal 500 according to some embodiments of the present disclosure. For example, the terminal 500 may be a mobile phone, a computer, a digital broadcast terminal, a messaging device, a game console, a tablet device, a medical device, an exercise device, a personal digital assistant, or the like.

Referring to FIG. 5, the terminal 500 may include one or more of the following components: a processing component 501, a memory 502, a power component 503, a multimedia component 504, an audio component 505, an input/output (I/O) interface 506, a sensor component 507, and a communication component 508.

The processing component 501 generally controls the overall operation of the terminal 500, such as operations associated with display, telephone call, data communication, camera operation, and recording operation. The processing component 501 may include one or more processors 510 to execute instructions to perform all or part of the operations of the methods described above. In addition, the processing component 501 may also include one or more modules to facilitate interactions between processing component 501 and other components. For example, the processing component 501 may include a multimedia module to facilitate interaction between the multimedia component 504 and the processing component 501.

The memory 502 is configured to store various types of data to support operation at the terminal 500. Examples of such data include instructions for any application or method operating on the terminal 500, contact data, telephone directory data, messages, pictures, video, etc. the memory 502 may be implemented by any type of volatile or non-volatile storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, magnetic disk, or optical disk.

The power component 503 provides power to various components of the terminal 500. The power component 503 may include a power management system, one or more power supplies, and other components associated with generating, managing, and distributing power for the terminal 500.

The multimedia component 504 includes a screen that provides an output interface between the terminal 500 and a user. In some embodiments, the screen may include a liquid crystal display (LCD) and a touch panel (TP). If the screen includes a touch panel, the screen may be implemented as a touch screen to receive input signals from a user. The touch panel includes one or more touch sensors to sense gestures on the touch, slide, and touch panel. The touch sensor may not only sense the boundary of a touch or sliding action, but also detect the duration and pressure associated with the touch or sliding operation. In some embodiments, the multimedia component 504 includes a front-facing camera and/or a rear-facing camera. When the terminal 500 is in an operation mode, such as a shooting mode or a video mode, the front-facing camera and/or the rear-facing camera may receive external multimedia data. Each front and/or rear camera may be a fixed optical lens system or have a focal length and optical zoom capability.

The audio component 505 is configured to output and/or input audio signals. For example, the audio component 505 includes a microphone (MIC) configured to receive an external audio signal when the terminal 500 is in an operating mode, such as a call mode, a recording mode, and a speech recognition mode. The received audio signal may be further stored in memory 510 or transmitted via the communication component 508. In some embodiments, the audio component 505 further includes a speaker for outputting an audio signal.

The I/O interface 506 provides an interface between the processing component 501 and a peripheral interface module, which may be a keyboard, a click wheel, a button, or the like. These buttons may include, but are not limited to, a home page button, a volume button, an activation button, and a lock button.

The sensor component 507 includes one or more sensors for providing a status assessment of various aspects to the terminal 500. For example, the sensor component 507 may detect an on/off state of the terminal 500, a relative positioning of the components, such as the display and keypad of the terminal 500, the sensor component 507 may also detect a change in the position of the terminal 500 or one of the components of the terminal 500, the presence or absence of user contact with the terminal 500, the orientation or acceleration/deceleration of the terminal 500, and a change in the temperature of the terminal 500. The sensor component 507 may include a proximity sensor configured to detect the presence of a nearby object in the absence of any physical contact. The sensor component 507 may also include a light sensor, such as a CMOS or CCD picture sensor, for use in imaging applications. In some embodiments, the sensor component 507 may also include an acceleration sensor, a gyroscope sensor, a magnetic sensor, a pressure sensor, or a temperature sensor.

The communication component 508 is configured to facilitate wired or wireless communication between terminal 500 and other devices. The terminal 500 may access a wireless network based on a communication standard, such as Wi-Fi, 2G, or 3G, or a combination thereof. In one exemplary embodiment, the communication component 508 receives broadcast signals or broadcast-related information from an external broadcast management system via a broadcast channel. In one exemplary embodiment, the communication component 508 further includes a near field communication (NFC) module to facilitate short-range communication. For example, the NFC module may be implemented based on radio frequency identification (RFID) technology, infrared data association (IrDA) technology, ultra wide band (UWB) technology, Bluetooth (BT) technology, or other technologies.

In an exemplary embodiment, terminal 500 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components for performing the above methods.

In an exemplary embodiment, a non-transitory computer-readable storage medium including instructions, such as the memory 502 including instructions executable by the processor 510 of the terminal 500 to perform the above-described methods, is also provided. For example, the non-transitory computer-readable storage medium may be a ROM, a random access memory (RAM), a CD-ROM, a magnetic tape, a floppy disk, an optical data storage device, or the like.

Embodiment of the present disclosure also provide a non-transitory computer readable storage medium, where instructions in the storage medium, when being executed by a processor of a mobile terminal, enables the mobile terminal to perform the method provided in any of the above embodiments.

Other embodiments of the disclosure will readily occur to those skilled in the art upon consideration of the specification and practice of the disclosure disclosed herein. This application is intended to cover any variations, uses, or adaptations of the disclosure that follow the general principles of the disclosure and include common general knowledge or customary technical means in the art not disclosed in this disclosure. The specification and examples are to be regarded as exemplary only, and the true scope and spirit of the disclosure are pointed out by the following claims.

It is to be understood that the disclosure is not limited to the precise construction already described above and illustrated in the accompanying drawings, and that various modifications and changes may be made without departing from the scope thereof. The scope of the disclosure is limited only by the appended claims.

The invention claimed is:

1. A method for network access, comprising:
acquiring, by a terminal, a first frequency band corresponding to a first cell where the terminal camps;
determining, by the terminal, whether the first frequency band belongs to a second frequency band predetermined by the terminal; and
performing, by the terminal, handover to a second cell different from the first cell in response to determining that the first frequency band does not belong to the second frequency band;
wherein determining, by the terminal, whether the first frequency band belongs to the second frequency band predetermined by the terminal comprises:
initiating an access request in the first cell; and
in response to an access failure to the access request, determining whether the first frequency band belongs to the second frequency band predetermined by the terminal.

2. The method of claim 1, further comprising:
reinitiating, by the terminal, the access request in the first cell in response to determining that the first frequency band belongs to the second frequency band.

3. The method of claim 1, further comprising:
in response to an access success to the access request, performing, by the terminal, data transmission of a service corresponding to the access request.

4. The method of claim 1, further comprising:
acquiring, by the terminal, card information of a subscriber identity card installed in the terminal; and
determining, by the terminal, the second frequency band according to the card information.

5. The method of claim 4, wherein the card information comprises an operator identification of the subscriber identity card; and
wherein determining, by the terminal, the second frequency band according to the card information comprises:
determining a frequency band corresponding to an operator of the subscriber identity card as the second frequency band according to the operator identification of the subscriber identity card.

6. The method of claim 1, wherein acquiring, by the terminal, the first frequency band corresponding to the first cell where the terminal camps comprises:
acquiring the first frequency band corresponding to the first cell in response to determining that the terminal is handed over to the first cell.

7. A terminal, comprising:
a processor; and
a memory for storing executable instructions executed by the processor,
wherein the processor is configured to:
acquire a first frequency band corresponding to a first cell where the terminal camps;
determine whether the first frequency band belongs to a second frequency band predetermined by the terminal; and
perform handover to a second cell different from the first cell in response to determining that the first frequency band does not belong to the second frequency band;
wherein the processor is configured to determine whether the first frequency band belongs to the second frequency band predetermined by the terminal comprises that the processor is configured to:
initiate an access request in the first cell; and
in response to an access failure to the access request, determine whether the first frequency band belongs to the second frequency band predetermined by the terminal.

8. The terminal of claim 7, wherein the processor is further configured to:
reinitiate the access request in the first cell in response to determining that the first frequency band belongs to the second frequency band.

9. The terminal of claim 7, wherein the processor is further configured to:
in response to an access success to the access request, perform data transmission of a service corresponding to the access request.

10. The terminal of claim 7, wherein the processor is further configured to:
acquire card information of a subscriber identity card installed in the terminal; and
determine the second frequency band according to the card information.

11. The terminal of claim 10, wherein the card information comprises an operator identification of the subscriber identity card; and
wherein the processor is configured to determine the second frequency band according to the card information comprises that the processor is configure to:
determine a frequency band corresponding to an operator of the subscriber identity card as the second frequency band according to the operator identification of the subscriber identity card.

12. The terminal of claim 7, wherein the processor is configured to acquire the first frequency band corresponding to the first cell where the terminal camps comprises that the processor is configure to:
acquire the first frequency band corresponding to the first cell in response to determining that the terminal is handed over to the first cell.

13. A non-transitory computer-readable storage medium, having stored computer-executable instructions thereon, wherein the computer-executable instructions, when being executed by a processor of a terminal, cause the processor to implement acts comprising:
acquiring a first frequency band corresponding to a first cell where the terminal camps;
determining whether the first frequency band belongs to a second frequency band predetermined by the terminal; and
performing handover to a second cell different from the first cell in response to determining that the first frequency band does not belong to the second frequency band;
wherein determining whether the first frequency band belongs to the second frequency band predetermined by the terminal comprises:
initiating an access request in the first cell; and
in response to an access failure to the access request, determining whether the first frequency band belongs to the second frequency band predetermined by the terminal.

14. The non-transitory computer-readable storage medium of claim 13, wherein the computer-executable instructions, when being executed by the processor of the terminal, cause the processor to implement acts further comprising:
reinitiating the access request in the first cell in response to determining that the first frequency band belongs to the second frequency band.

15. The non-transitory computer-readable storage medium of claim 13, wherein the computer-executable instructions, when being executed by the processor of the terminal, cause the processor to implement acts further comprising:
in response to an access success to the access request, performing data transmission of a service corresponding to the access request.

16. The non-transitory computer-readable storage medium of claim 13, wherein the computer-executable instructions, when being executed by the processor of the terminal, cause the processor to implement acts further comprising:
acquiring card information of a subscriber identity card installed in the terminal; and
determining the second frequency band according to the card information.

17. The non-transitory computer-readable storage medium of claim 16, wherein the card information comprises an operator identification of the subscriber identity card; and
wherein determining the second frequency band according to the card information comprises:
determining a frequency band corresponding to an operator of the subscriber identity card as the second frequency band according to the operator identification of the subscriber identity card.

* * * * *